US012809093B2

(12) United States Patent
Chandrahalim et al.

(10) Patent No.: US 12,809,093 B2
(45) Date of Patent: Nov. 24, 2026

(54) METHOD OF ENABLING PARITY-TIME SYMMETRIC OPTICAL WAVEGUIDES USING LIQUIDS

(71) Applicant: Government of the United States, as represented by the Secretary of the Air Force, Wright-Patterson AFB, OH (US)

(72) Inventors: Hengky Chandrahalim, Beavercreek, OH (US); Franck Assogba Onanga, Riverside, OH (US)

(73) Assignee: Government of the United States, as represented by the Secretary of the Air Force, Wright-Patterson AFB, OH (US)

( * ) Notice: Subject to any disclaimer, the term of this patent is extended or adjusted under 35 U.S.C. 154(b) by 361 days.

(21) Appl. No.: 18/441,259

(22) Filed: Feb. 14, 2024

(65) Prior Publication Data

US 2024/0310581 A1 Sep. 19, 2024

Related U.S. Application Data

(60) Provisional application No. 63/604,987, filed on Dec. 1, 2023, provisional application No. 63/452,494, filed on Mar. 16, 2023.

(51) Int. Cl.
*G02B 6/35* (2006.01)
*B01L 3/00* (2006.01)

(52) U.S. Cl.
CPC ...... *G02B 6/3538* (2013.01); *B01L 3/502715* (2013.01)

(58) Field of Classification Search
CPC .... G02B 6/351; G02B 6/3536; G02B 6/3538; B01L 3/5027; B01L 3/502715
See application file for complete search history.

(56) References Cited

U.S. PATENT DOCUMENTS 5,699,462 A * 12/1997 Fouquet ............... G02B 6/3538 385/17
6,438,279 B1 * 8/2002 Craighead ............... G02B 6/10 385/12

(Continued)

FOREIGN PATENT DOCUMENTS

| | | | |
|---|---|---|---|
| GB | 2207522 | A * | 2/1989 |
| KR | 20210021679 | A | 3/2021 |
| WO | 2022226508 | A1 | 10/2022 |

OTHER PUBLICATIONS

X. Tang et al. Design for tunable optofluidic optical coupler with large dynamic range. arXiv: 1909.13644 [physics.app-ph], Aug. 2019, https://doi.org/10.48550/arXiv.1909.13644 (Year: 2019).*

(Continued)

*Primary Examiner* — Michael Stahl

(74) *Attorney, Agent, or Firm* — AFMCLO/JAZ; Richard M. Mescher

(57) ABSTRACT

The present invention relates to a method of enabling parity-time symmetric optical waveguides using liquids. Applicants provide a solution to the challenge of mass producing PT symmetric optical waveguide systems by introducing liquids that can be dynamically flown between optical waveguides. Using this method, evanescent wave coupling between optical waveguides can be achieved while having coupling gap dimensions that can be patterned using a standard photolithography process. Thus economic, rapid, and mass production of PT symmetric optical waveguide systems for a broad range of applications is disclosed.

33 Claims, 4 Drawing Sheets

(56) References Cited

U.S. PATENT DOCUMENTS

| | | | |
|---|---|---|---|
| 11,650,370 B1 | 5/2023 | Chandrahalim et al. | |
| 2003/0012483 A1* | 1/2003 | Ticknor | F04B 19/006 385/39 |
| 2007/0237460 A1 | 10/2007 | Fan et al. | |
| 2010/0067847 A1* | 3/2010 | Levy | G02B 6/3538 427/579 |
| 2011/0045472 A1 | 2/2011 | Gunn, III | |
| 2017/0003454 A1* | 1/2017 | Baets | G02B 6/3596 |
| 2023/0131116 A1* | 4/2023 | Chandrahalim | H01S 5/041 385/30 |
| 2023/0408852 A1* | 12/2023 | Cheung | G02F 1/01708 |
| 2024/0045156 A1* | 2/2024 | Bian | G02B 6/4295 |

OTHER PUBLICATIONS

K. Okubo et al. Silicon nitride directional coupler interferometer for surface sensing. Optical Engineering, vol. 56 iss. 1, 017101, Jan. 2017, https://doi.org/10.1117/1.OE.56.1.017101 (Year: 2017).*
West, C. D.; "Immersion liquids of high refractive index," Am. Mineral., 1936, vol. 21, No. 4, pp. 245-249.
Smietana, M.; Bock, W. J.; Mikulic, P.; Chen, J.; "Pressure Sensing in High-Refractive-Index Liquids Using Long-Period Gratings Nanocoated with Silicon Nitride," Sensors, 2010, vol. 10, No. 12, Art. No. 12.
Van Zwol, P. J .; Palasantzas, G.; "Repulsive Casimir forces between solid materials with high-refractive-index intervening liquids," Phys. Rev. A, 2010, vol. 81, No. 6, p. 062502, doi: 10.1103/PhysRevA.81.062502.
Kayama, Y.; Ichikawa, T.; Ohno, H.; "Transparent and colourless room temperature ionic liquids having high refractive index over 1.60," Chem. Commun., 2014, vol. 50, No. 94, pp. 14790-14792, doi: 10.1039/C4CC06145D.
http://ieexplore.ieee.org/document/7061461/, "Photonic-Molecule single-Mode Laser," 2021.
Shang, L.; Liu, L.; Xu, L.; "Single-frequency coupled asymmetric microcavity laser," Opt. Lett., 2008, vol. 33, No. 10, pp. 1150-1152, doi: 10.1364/OL.33.001150.
Lee, W.; Li, H.; Suter, J. D.; Reddy, K.; Sun, Y.; Fan, X.; "Turnable single mode lasing from an on-chip optofluidic ring resonator laser," Appl. Phys. Lett., 2011, vol. 98, No. 6, p. 061103, doi: 10.1063/1.3554362.
Li, Z.; "Optofluidic coupled micro-ring resonators for biosensing," IEEE International Frequence Control Symposium Proceedings, 2012, pp. 1-4, doi: 10.1109/FCS.2012.6243744.
Chandrahalim, H.; Fan, X.; "Reconfigurable Solid-state Dye-doped Polymer Ring Resonator Lasers," Sci. Rep., 2015, vol. 5, No. 1, p. 18310, doi: 10.1038/srep18310.
Zhao, C. Y.; Liao, J. X.; Zhang, L.; "Vernier effect of cascaded dual microring sensor," Pramana, 2018, vol. 91, No. 6, p. 81, doi: 10.1007/s12043-018-1654-6.
Vollmer, F.; Arnold, S.; Keng, D.; "Single virus detection from the reactive shift of a whispering-gallery mode," Proc. Natl. Acad. Sci., 2008, vol. 105, No. 52, pp. 20701-20704, doi: 10.1073/pnas.0808988106.
He, L.; Özdemir, Ş. K.; Zhu, J.; Kim, W.; Yang, L.; "Detecting single viruses and nanoparticles using whispering gallery microlasers," Nat. Nanotechnol, 2011, vol. 6, No. 7, pp. 428-432, doi: 10.1038/nnano.2011.99.
Zhu, J.; Özdemir, Ş. K; He, L.; Chen D.-R.; Yang. L.; "Single virus and nanoparticle size spectrometry by whispering-gallery-mode microcavities," Opt. Express, 2011, vol. 19, No. 17, pp. 16195-16206, doi: 10.1364/OE.19.016195.
White, I. M.; Oveys, H.; Fan, X.; "Liquid-core optical ring-resonator sensors," Opt. Lett., 2006, vol. 31, No. 9, pp. 1319-1321, doi: 10.1364/OL.31.001319.
Carmon, T.; Yang, L.; Vahala, K.J.; "Dynamical thermal behavior and thermal self-stability of microcavities," Opt. Express, 2004, vol. 12, No. 20, pp. 4742-4750, doi: 10.1364/OPEX.12.004742.
Ioppolo, T.; Kozhevnikov, M.; Stepaniuk, V.; Ötügen, M. V.; Sheverev, V.; "Micro-optical force sensor concept based on whispering gallery mode resonators," Appl. Opt., 2008, vol. 47, No. 16, pp. 3009-3014, doi: 10.1364/ AO.47.003009.
Forstner, S. et al.; "Ultrasensitive Optomechanical Magnetometry," Adv. Mater., 2014, vol. 26, No. 36, pp. 6348-6353, doi: 10.1002/adma.201401144.
Zhu, J. et al.; "On-chip single nanoparticle detection and sizing by mode spliiting in a ultrahigh-Q microresonator," Nat. Photonics, 2010, vol. 4, No. 1, pp. 46-49, doi: 10.1038/nphoton.2009.237.
Shao, L. et al.; "Detection of Single nanoparticles and Lentiviruses Using Microcavity Resonance Broadening," Adv. Mater., 2013, vol. 25, No. 39, pp. 5616-5620, doi: 10.1002/adma201302572.
Swaim, J. D.; Knittel, J.; Bowen, W. P.; "Detection of nanoparticles with a frequency locked whispering gallery mode microresonator," Appl. Phys. Lett., 2013, vol. 102, No. 18, p. 183106, doi: 10.1063/1.4804243.
Shen, B.-Q. et al.; "Detection of Single Nanoparticles Using the Dissipative Interaction in a High-$Q$ Microcavity," Phys. Rev. Appl., 2016, vol. 5, No. 2, p. 024011, doi: 10.1103/PhysRevApplied.5.024011.
Yu, W.; Jiang, W.C.; Lin, Q.; Lu, T.; "Cavity optomechanical spring sensing of single molecules," Nat. Commun., 2016, vol. 7, No. 1, p. 12311, doi: 10.1038/ncomms12311.
Su, J.; Goldberg, A. F.; Stoltz, B. M.; "Label-free detection of single nanoparticles and biological molecules using microtoroid optical resonators," Light Sci. Appl., 2016, vol. 5, No. 1, pp. e16001-e16001, doi: 10.1038/Isa.2016.1.
Armani, A. M.; Vahala, K. J.; "Heavy water detection using ultra-high-Q microcavities," Opt. Lett., 2006, vol. 31, No. 12, pp. 1896-1898, doi: 10.1364/OL.31.001896.
Chen, W.; Özdemir, Ş. K.; Zhao, G.; Wiersig, J.; Yang, L.; "Exceptional points enhance sensing in an optical microcavity," Nature, 2017, vol. 548, No. 7666, pp. 192-196, doi: 10.1038/nature23281.
Wang, C. et al.; "Electromagnetically induced transparency at a chiral exceptional point," Nat. Phys., 2020, vol. 16, No. 3, pp. 334-340, doi: 10.1038/s41567-019-0746-7.
Miri, M.-A.; Alù, A; "Exceptional points in optics and photonics," Science, 2019, vol. 363, No. 6422, doi: 10.1126/ science.aar770.
Wiersig, J.; "Enhancing the Sensitivity of Frequency and Energy Splitting Detection by Using Exceptional Points: Application to Microcavity sensors for Single-Particle Detection," Phys. Rev. Lett., 2014, vol. 112, No. 20, p. 203901, doi: 10.1103/PhysRevLett.112.203901.
Li, B.-B. et al.; "Experimental controlling of Fano resonance in indirectly coupled whispering-gallery microresonators," Appl. Phys. Lett., 2012, vol. 100, No. 2, p. 021108, doi: 10.1063/1.3675571.
Li, B.-B. et al.; "Experimental observation of Fano resonance in a single whispering-gallery microresonator," Appl. Phys. Lett., 2011, vol. 98, No. 2, p. 021116, doi: 10.1063/1.3541884.
Chandrahalim, H.; Chen, Q.; Said, A.; Dugan, M.; Fan, X.; "Monolithic optofluidic ring resonator lasers created by femtosecond laser nanofabrication," Lab Chip, 2015, vol. 15, No. 10, pp. 2335-2340, doi 10.1039/c51c00254k.
Chandrahalim, H.; Rand, S.; Fan, X.; "Fusion of renewable ring resonator lasers and ultrafast laser inscribed photonic waveguides," Sci. Rep., 2016, vol. 6, No. 32668, pp. 1-10, doi: 10.1038/srep32668.
Wan, L.; Chandrahalim, H.; Chen, C.; Chen, Q.; Mei, T.; Oki, Y.; Nishimura, N.; Guo, L.; Fan, X.; "On-chip, high-sensitivity temperature sensors based on dye-doped solid-state polymer microring lasers," Appl. Phys. Lett., 2017, vol. 111, No. 6, p. 061109, doi: 10.1063/1.4986825.
Chen, C.; Wan, L.; Chandrahalim, H.; Zhou, J.; Zhang, H.; Cho, S.; Mei, T.; Yoshioka, H.; Tian, H.; Nishimura, N.; Fan, X.; Guo, L.; Oki, Y.; "Effects of edge inclination angles on whispering-gallery modes in printable wedge microdisk lasers," Opt. Express, 2018, vol. 26, No. 1, pp. 233-241, doi: 10.1364/OE.26.000233.
Wan, L.; Chandrahalim, H.; Zhou, J.; Li, Z.; Chen, C.; Cho, S.; Zhang, H.; Mei, T.; Tian, H.; Oki, Y.; Nishimura, N.; Fan, X.; Guo, L.; "Demonstration of versatile whispering-gallery micro-lasers for remote refractive index sensing," Opt. Express, 2018, vol. 26, No. 5, pp. 5800-5809, doi: 10.1364/OE.26.005800.

(56) References Cited

OTHER PUBLICATIONS

Chen, C.; Yuan, J.; Wan, L.; Chandrahalim, H.; Chen, Z.; Nishimura, N.; Takeda, H.; Yoskioka, H.; Liu, W.; Oki, Y.; Fan, X.; Li, Z.; "Demonstration of on-chip quantum dots microcavity lasers in a molecularly engineered annular groove," Opt. Lett, 2019, vol. 44, No. 3, pp. 495-498, doi: 10.1364/OL.44.000495.
Chandrahalim, H.; Chen, Q.; Said, A.; Dugan, M.; Bado, P.; Fan, X.; "Optofludic ring cavity lasers fabricated by 3-D femtosecond laser writing technology," Frontiers in Optics (FIO)/Laser Science (LS), 2015, vol. XXXI, pp. JTu4A.64, doi: 10.1364/FIO.2015.JTu4A.64.
Chandrahalim, H.; Fan, X.; "Monolithically integrated ring resonator systems on-chip," Conference on Lasers and Electro-Optics (CLEO), 2017, pp. JTh4M.1, doi: 10.1364/CLEO_AT.2017.JTh4M.1.
Chandrahalim, H.; Rand, S.; Fan, X.; "Refillable and reconfigurable dye-doped ring lasers," Conference on Lasers and Electro-Optics (CLEO), 2017, pp. JTh2A.2, doi: 10.1364/CLEO_AT.2017.JTh2A.2.
Chandrahalim, H.; Rand, S.; Fan, X.; "Integration of ultrafast laser-inscribed optical waveguides and renewable ring lasers," Conference on Lasers and Electro-Optics (CLEO), 2017, pp. AW4B.5, doi: 10.1364/CLEO_AT.2017. AW4B.5.
Chandrahalim, H.; Fan, X.; "Hybrid fabrication techniques of 3-D integrated microlaser sensors," Advanced Photonics Congress (APC), 2017, pp. SeM2E.1, doi: 10.1364/SENSORS.2017.SeM2E.1.
Rabus, D. G.; Sada, C.; Integrated Ring Resonators A Compendium, 2020, Second Edition, 1-372.
Assogba Onanga, F; Chandrahalim, H. Optofluidic passive parity-time-symmetric systems, Submitted for Review to the Royal Society Open Science on Aug. 18, 2023.
Chandrahalim, H.; Chen, Q.; Said, A. A.; Dugan, M.; Fan, X.; Monolithic optofluidic ring resonator lasers created by femtosecond laser nanofabrication, Lab Chip, 2015, 15, 2335, 1-17.

* cited by examiner

METHOD OF ENABLING PARITY-TIME SYMMETRIC OPTICAL WAVEGUIDES USING LIQUIDS

CROSS-REFERENCE TO RELATED APPLICATION

The present application claims priority to U.S. Provisional Application Ser. No. 63/604,987 filed Dec. 1, 2023, and U.S. Provisional Application Ser. No. 63/452,494 filed Mar. 16, 2023, the contents of both such provisional applications hereby being incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to a method of enabling parity-time symmetric optical waveguides using liquids.

BACKGROUND OF THE INVENTION

This invention presents a method of using liquids to facilitate the realization of parity-time (PT) symmetric optical waveguides on highly integrated microscale platforms. PT symmetric systems in various fields have been extensively investigated in the last two decades as they promise entirely new classes of sensors and signal processors that have smaller sizes, consume less power, and perform better than the existing ones. A PT symmetric system in optics can be realized by evanescently coupling two optical waveguides and introducing an optically lossy material on one of the waveguides. The required coupling distance between two optical waveguides in air is typically less than 500 nm for near infrared wavelengths and less than 100 nm for ultraviolet wavelengths. Therefore, the physical construction of the coupling region between waveguides must be made using expensive and slow electron beam lithography. This manufacturing barrier has posed a serious challenge to mass produce PT symmetric optical waveguide systems. Applicants provide a solution to solve this fabrication issue by introducing liquids that can be dynamically flown between optical waveguides. Using this method, evanescent wave coupling between optical waveguides can be achieved while having coupling gap dimensions that can be patterned using a standard photolithography process. Thus economic, rapid, and mass production of PT symmetric optical waveguide systems for a broad range of applications is disclosed.

SUMMARY

The present invention relates to a method of enabling parity-time symmetric optical waveguides using liquids. Applicants provide a solution to the challenge of mass producing PT symmetric optical waveguide systems by introducing liquids that can be dynamically flown between optical waveguides. Using this method, evanescent wave coupling between optical waveguides can be achieved while having coupling gap dimensions that can be patterned using a standard photolithography process. Thus economic, rapid, and mass production of PT symmetric optical waveguide systems for a broad range of applications is disclosed.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
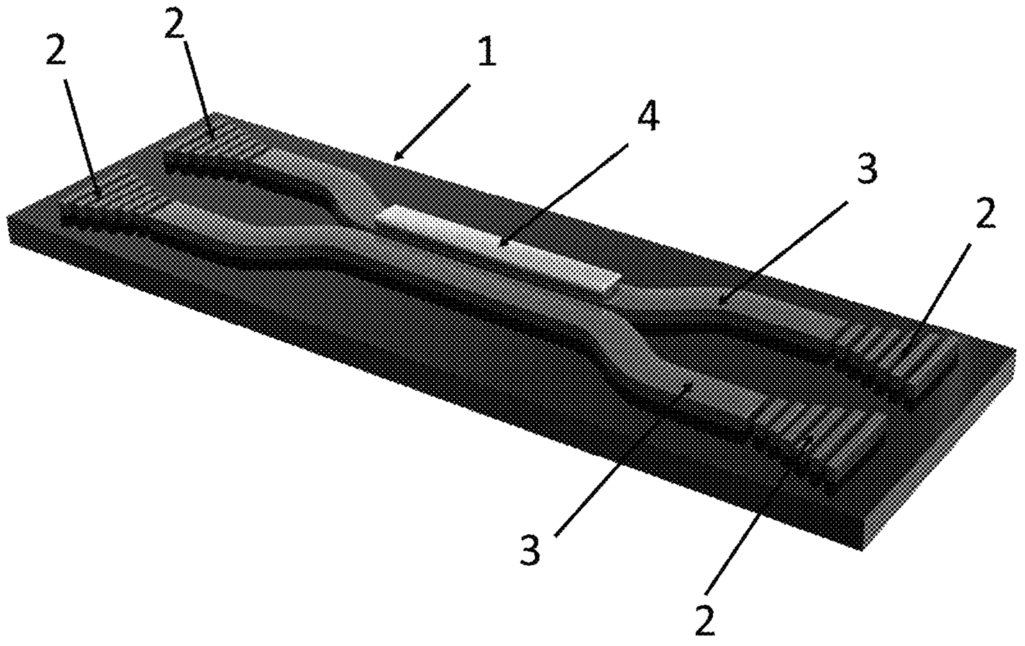
FIG. 1 depicts the base of an optofluidic device having untopped and unclosed coupled waveguides. Such figure shows substrate (1), optical gratings (2), optical waveguides (3) and optically lossy thin film (4).
Figure 2:
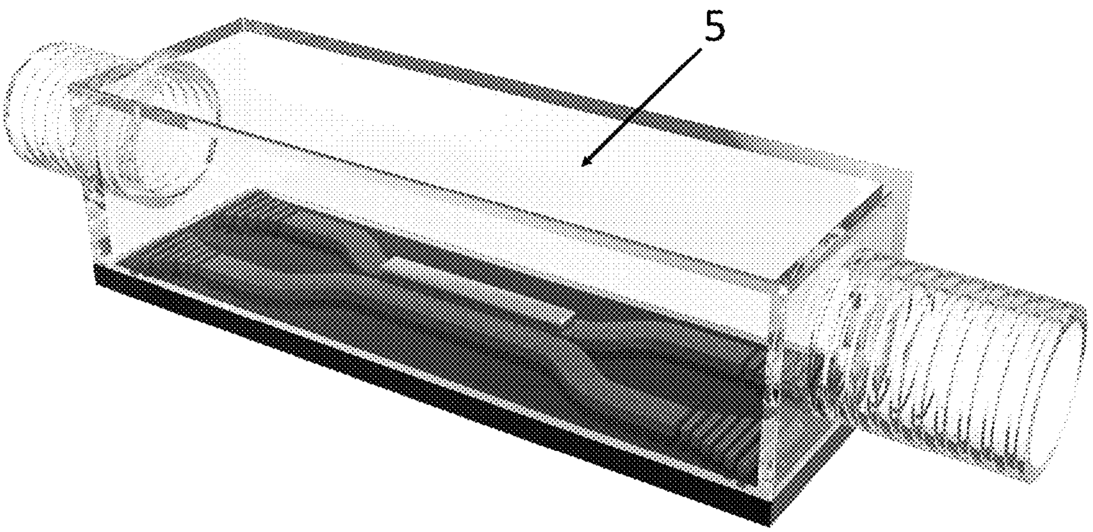
FIG. 2 depicts an optofluidic device without fluidic cladding having the base of FIG. 1 within an optically transparent cage (5).
Figure 3:
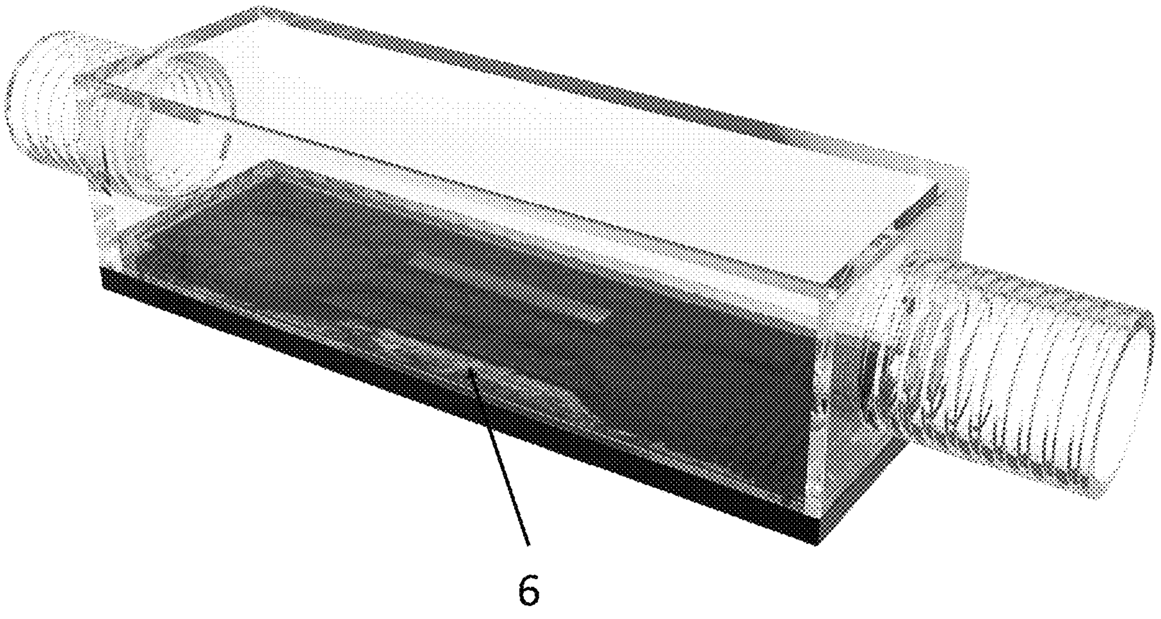
FIG. 3 depicts the optofluidic device of FIG. 2 having fluidic cladding (6).
Figure 4:
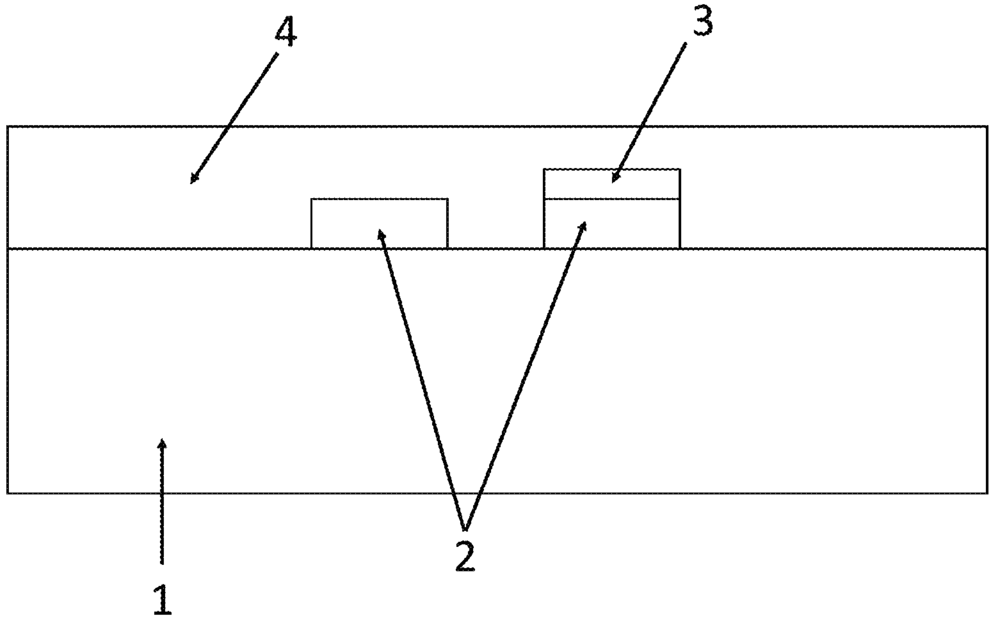
FIG. 4 is a cross sectional view of FIG. 3. Such figure shows substrate (1), optical gratings (2), optical waveguides (3) and optically lossy thin film (4).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms “a”, “an” and “the” mean “at least one”.

As used herein, the terms “include”, “includes” and “including” are meant to be non-limiting.

As used herein, the words “about,” “approximately,” or the like, when accompanying a numerical value, are to be construed as indicating a deviation as would be appreciated by one of ordinary skill in the art to operate satisfactorily for an intended purpose.

As used herein, the words “and/or” means, when referring to embodiments (for example an embodiment having elements A and/or B) that the embodiment may have element A alone, element B alone, or elements A and B taken together.

As used herein, complex refractive index means a dimensionless number that gives the indication of the light bending and absorbing ability of that medium.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Optofluidic Device

For purposes of this specification, headings are not considered paragraphs of the present specification. The individual number of each paragraph above and below this paragraph can be determined by reference to this paragraph's number. In this paragraph, Applicants disclose optofluidic device comprising:

a) a substrate having a top side and a bottom side and a refractive index;

b) two or more patterns, each pattern having a top side and a bottom side, said bottom side disposed on said substrate's top side, said two or more patterns optionally comprising at least one grating, said two or more patterns being separated from each other by a gap of about 10 nanometers to about 2 microns, preferably said gap is from about 1 micron to about 2 microns and each pattern independently comprising a patterning material having:

(i) a refractive index that is at least 0.01% greater than said substrate's refractive index, preferably said pattern material having a refractive index that is at least 0.1% greater than said substrate's refractive index, more preferably said pattern material having a refractive index that is at least 1% greater than said substrate's refractive index, (ii) a transparency of at least 60%, preferably said pattern material has a transparency of at least 70%, more preferably said pattern material has a transparency of at least 80% to light having a wavelength of 200 nm to about 2000 nm, preferably to light having a wavelength of 300 nm to about 1500 nm, more preferably to light having a wavelength of 400 nm to about 1500 nm;

and a film, said film being disposed on one of said patterns' top side;

c) at least one fluid host comprising at least one fluid cavity, said at least one fluid cavity comprising a ceiling and sides, said ceiling being flat, said at least one fluid cavity comprising a liquid, each fluid host having a transparency of at least 50%, preferably each said fluid host has a transparency of at least 70%, more preferably each said fluid host has a transparency of at least 80% to light having a wavelength of 200 nm to about 2000 nm, preferably to light having a wavelength of 300 nm to about 1500 nm, more preferably to light having a wavelength of 400 nm to about 1500 nm; and each liquid having a transparency of at least 50%, preferably each said liquid has a transparency of at least 70%, more preferably each said liquid has a transparency of at least 80% to light having a wavelength of 200 nm to about 2000 nm, preferably to light having a wavelength of 300 nm to about 1500 nm, more preferably to light having a wavelength of 400 nm to about 1500 nm and a refractive index that is at least 0.01% lower than said patterns' refractive index, preferably said liquid has a refractive index that is at least 1% lower than said patterns' refractive index;

at least a pair of said two or more patterns being disposed on one side of said substrate, said at least one liquid host being disposed over at least said pair of said two or more patterns such that, said liquid in said fluid host's fluid cavity puts said pair of patterns in liquid communication. To be clear, each fluid cavity in each fluid host typically comprises a flat roof Here, Applicants note that the aforementioned patterns are evanescently coupled optical waveguides.

Applicants disclose the optofluidic device of the preceding paragraph wherein:

a) said substrate comprises a material selected from the group consisting of fused-silica, quartz, silicon, and sapphire wafer, preferably said substrate comprises a material selected from the group consisting of fused-silica, quartz, and sapphire wafer more preferably said substrate comprises a material selected from the group consisting of fused-silica;

b) said patterning material comprises a material selected from the group consisting of transparent dielectric films and light emitting films, preferably said patterning material comprises a material selected from the group consisting of transparent dielectric films and light emitting films that operate from 300 nm to 2000 nm wavelength range, for example, silicon nitride, silicon dioxide, zinc oxide, alumina, rare-earth-doped alumina, aluminum nitride, and gallium nitride, more preferably said patterning material comprises a material selected from the group consisting of transparent dielectric films and light emitting films that operate from 600 nm to 1600 nm wavelength range, most preferably said film comprises silicon nitride, silicon dioxide, alumina, rare-earth-doped alumina, and/or group III-V compound semiconductor materials. All transparent dielectric films and light emitting films can be deposited in the standard semiconductor cleanroom laboratory, for example AFRL, Intel, IBM, TSMC cleanroom laboratories.

c) said fluid host comprises a material selected from the group consisting of transparent polymers, borosilicate, fused-silica, quartz, preferably said fluid host comprises a material selected from the group consisting of fused-silica, quartz, more preferably said fluid host comprises a material selected from the group consisting of fused-silica;

d) said liquid comprises a material selected from the group consisting of an aromatic hydrocarbon, iodomethane, alcohol, and water, preferably said liquid comprises a material selected from the group consisting of alcohol, and water, more preferably said liquid comprises water; and e) said film having a thickness from about 10 nanometers to about 300 nanometers, preferably said film having a thickness from about 50 nanometers to about 200 nanometers, more preferably said film having a thickness from about 80 nanometers to about 140 nanometers, and a complex refractive index, preferably said film to comprises a metal, preferably said film comprises silver, gold, copper, aluminum, platinum, titanium, chromium, iridium, molybdenum, nickel, niobium, palladium, rhodium, rhenium, ruthenium, zirconium and mixtures thereof.

Applicants disclose the optofluidic device optofluidic device of the preceding two paragraphs wherein said at least one fluid cavity has at least one fluid inlet and at least one fluid outlet.

Applicants disclose the optofluidic device optofluidic device of the preceding three paragraphs, said optofluidic device comprising one through 20 pairs of said two or more patterns, preferably said optofluidic device comprises 10 through 20 pairs of said two or more patterns, more preferably said optofluidic device comprises 15 through 20 pairs of said two or more patterns.

Applicants disclose the optofluidic device of the preceding four paragraphs, said optofluidic device comprising one through 6 fluid hosts, preferably said optofluidic device comprises 2 through 6 fluid hosts, more preferably said optofluidic device comprises 4 through 6 fluid hosts.

Applicants disclose the optofluidic device of the preceding five paragraphs wherein:

a.) said two or more patterns are symmetric and have a geometry selected from a line, a curved line, a ring, a disk, a triangle, a polygon;

b.) each said fluid host has, independently, a periphery that is a polygon, circular, triangular, preferably each said fluid host has, independently, a periphery that is, rectangular, or square, more preferably each said fluid host has, independently, a periphery that is rectangular; and c.) each said fluid cavity's sides, independently form a polygon, triangle, or said sides are curved, preferably each said fluid cavity has, independently, a geometry that is, rectangular, square, more preferably each said fluid cavity has, independently, a geometry that is rectangular.

Applicants disclose the optofluidic device of the preceding six paragraphs wherein each fluid host independently comprises one to 4 fluid cavities, preferably each fluid host independently comprises one to 3 fluid cavities, more preferably each fluid host independently comprises one to 2 fluid cavities.

Applicants disclose an article comprising the optofluidic device of the preceding seven paragraphs, preferably said article is a laser, gas sensor, chemical sensor, biochemical sensor, biological sensor, particle sensor, temperature sensor, force sensor, refractive index sensor, magnetic sensor, inertial sensor or optical signal processor.

Applicants disclose a finished article comprising the article of the preceding paragraph, said finished article being a motor vehicle such as a car, truck or tank, water vehicle such a boat, ship, hovercraft, or submarine, aerospace vehicle, computer, weapon systems, wireless device such as a cell phone or biomedical device.

Process of Making Optofluidic Device

Applicants disclose a process of making an optofluidic device comprising:

a) a substrate having a top side and a bottom side and a refractive index;

b) two or more patterns, each pattern having a top side and a bottom side, said bottom side disposed on said substrate's top side, said two or more patterns optionally comprising at least one grating, said two or more patterns being separated from each other by a gap of about 10 nanometers to about 2 microns, preferably said gap is from about 1 micron to about 2 microns and each pattern independently comprising a patterning material having:

(i) a refractive index that is at least 0.01% greater than said substrate's refractive index, preferably said patterning material having a refractive index that is at least 0.1% greater than said substrate's refractive index, more preferably said patterning material comprises a dielectric film having a refractive index that is at least 1% greater than said substrate's refractive index, (ii) a transparency of at least 60%, preferably said patterning material has a transparency of at least 70%, more preferably said patterning material has a transparency of at least 80% to light having a wavelength of 200 nm to about 2000 nm, preferably to light having a wavelength of 300 nm to about 1500 nm, more preferably to light having a wavelength of 400 nm to about 1500 nm;

and a film, said film being disposed on one of said patterns' top side;

c) at least one fluid host comprising at least one fluid cavity comprising a liquid, each fluid host having a transparency of at least 50%, preferably each said fluid host has a transparency of at least 70%, more preferably each said fluid host has a transparency of at least 80% to light having a wavelength of 200 nm to about 2000 nm, preferably to light having a wavelength of 300 nm to about 1500 nm, more preferably to light having a wavelength of 400 nm to about 1500 nm; and each liquid having a transparency of having a transparency of at least 50%, preferably each said liquid has a transparency of at least 70%, more preferably each said liquid has a transparency of at least 80% to light having a wavelength of 200 nm to about 2000 nm, preferably to light having a wavelength of 300 nm to about 1500 nm, more preferably to light having a wavelength of 400 nm to about 1500 nm and a refractive index that is at least 0.01% lower than said film's refractive index, preferably said liquid has a refractive index that is at least 1% lower than said patterning material's refractive index;

at least a pair of said two or more patterns being disposed on one side of said substrate, said at least one fluid host being disposed over at least said pair of said two or more patterns; and fluid coupling said patterns by introducing into said fluid host's fluid cavity a liquid that puts all said patterns in liquid communication.

Applicants disclose the process of the preceding paragraph wherein:

a) said substrate comprises a material selected from the group consisting of fused-silica, quartz, silicon, and sapphire wafer, preferably said substrate comprises a material selected from the group consisting of fused-silica, quartz, and sapphire wafer more preferably said substrate comprises a material selected from the group consisting of fused-silica;

b) said patterning material comprises a material selected from the group consisting of transparent dielectric films and light emitting films, preferably said patterning material comprises a material selected from the group consisting of transparent dielectric films and light emitting films that operate from 500 nm to 2000 nm wavelength range, more preferably said patterning material comprises a material selected from the group consisting of transparent dielectric films and light emitting films that operate from 600 nm to 1600 nm wavelength range; preferably said patterning material is a dielectric film that operates from 600 nm to 1600 nm wavelength range, most preferably said patterning material comprises silicon nitride, silicon dioxide, alumina, rare-earth-doped alumina, and/or group III-V compound semiconductor materials; all transparent dielectric films and light emitting films can be deposited in the standard semiconductor cleanroom laboratory, for example AFRL, Intel, IBM, TSMC cleanroom laboratories.

c) said fluid host comprises a material selected from the group consisting of transparent polymers, borosilicate, fused-silica, quartz, preferably said fluid host comprises a material selected from the group consisting of fused-silica, quartz, more preferably said fluid host comprises a material selected from the group consisting of fused-silica; and d) said liquid comprises a material selected from the group consisting of an aromatic hydrocarbon, iodomethane, alcohol, and water, preferably said liquid comprises a material selected from the group consisting of alcohol, and water, more preferably said liquid comprises water; and e) said film having a thickness from about 10 nanometers to about 300 nanometers, preferably said film having a thickness from about 50 nanometers to about 200 nanometers, more preferably said film having a thickness from about 80 nanometers to about 140 nanometers and a complex refractive index, preferably said film comprises a metal, preferably said film comprises silver, gold, copper, aluminum, platinum, titanium chromium, iridium, molybdenum, nickel, niobium, palladium, rhodium, rhenium, ruthenium, zirconium and mixtures thereof.

Applicants disclose the process of the preceding two paragraphs wherein said optofluidic device's at least one fluid cavity has at least one fluid inlet and at least one fluid outlet.

Applicants disclose the process of the preceding three paragraphs wherein said optofluidic device comprises one through 20 pairs of said two or more patterns, preferably said optofluidic device comprises 10 through 20 pairs of said two or more patterns, more preferably said optofluidic device comprises 15 through 20 pairs of said two or more patterns.

Applicants disclose the process of the preceding four paragraphs wherein said optofluidic device comprises one through 6 fluid hosts, preferably said optofluidic device comprises 2 through 6 fluid hosts, more preferably said optofluidic device comprises 4 through 6 fluid hosts.

Applicants disclose the process of the preceding five paragraphs wherein for said optofluidic device:

a.) said two or more patterns are symmetric and have a geometry selected from a line, a curved line, a ring, a disk, a triangle, a polygon;

b.) each said fluid host has, independently, a periphery that is a polygon, circular, triangular, preferably each said fluid host has, independently, a periphery that is, rectangular, or square, more preferably each said fluid host has, independently, a periphery that is rectangular; and c.) each said fluid cavity has, independently, a geometry that is a polygon, circular, triangular, preferably each said fluid cavity has, independently, a geometry that is, rectangular, square, more preferably each said fluid cavity has, independently, a geometry that is rectangular.

Applicants disclose the process of the preceding six paragraphs wherein for said optofluidic device each fluid host independently comprises one to 4 fluid cavities, preferably each fluid host independently comprises one to 3 fluid cavities, more preferably each fluid host independently comprises one to 2 fluid cavities.

Method of Using Optofluidic Device

Applicants disclose a method of using the optofluidic devices disclosed by Applicants in this specification, said method comprising placing said patterns in fluid contact using a fluid; inputting light to one of said patterns to induce light coupling with another pattern and light splitting; and detecting said split light.

Applicants disclose the method of the previous paragraph wherein the fluid's composition is altered until said fluid and said patterns are parity-time symmetrical.

Applicants disclose the method of any previous paragraph wherein the fluid's composition is altered until said fluid and said patterns are parity-time symmetrical. When said fluid and said patterns are parity-time symmetrical, optofluidic device's sensitivity as a sensor is unexpectedly improved, for example by at least one order of magnitude.

Applicants disclose the method of any previous paragraph wherein a liquid with a refractive index equal to lower than that of fluid host is flown through the fluid host, preferably a liquid with a refractive index equal to that of fluid host is flown through the fluid host.

Applicants disclose the method of any previous paragraph wherein the coupled patterns have a coupling strength between coupled patterns and said coupling strength is tuned in real time by flowing two or more liquids having different refractive indices through said fluid host.

Test Methods

For purposes of this specification, an array of coupled waveguides with fixed gaps (specified in the first paragraph of the section of this specification titled Optofluidic Device) is enclosed in said optically transparent host.

Each coupled waveguides in the said array above has one waveguide that has said optically lossy film.

The widths of the said optically lossy film in the coupled waveguides array in vary from 30% to 100% of the waveguide's width.

Parity-time symmetry is determined by monitoring the intensity of light at the output ports of the coupled waveguides in said array in the first paragraph of this test method. Before PT symmetry condition is achieved, light input to one of the waveguides yields light output at the other end of the same waveguide only.

Add transparent liquid with refractive index the same or higher than the waveguides.

Slowly decrease the refractive index of liquid in the cavity by mixing it with liquid that has lower refractive index.

Keep monitoring the output ports of the two waveguides.

When a PT-symmetric condition is achieved, light input to the neutral waveguide will produce light output at the other end of both waveguides and light input to the waveguide with optically lossy film will produce light output only at the other end of the neutral waveguides.

When a PT-broken-symmetric condition is achieved, light input to the neutral waveguide will produce light output at the other end of the sane neutral waveguide only and light input to the waveguide with optically lossy film will also produce light output only at the other end of the neutral waveguides.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. The described optofluidic PT symmetric system (as tested by Applicants' Test Method) can function as an optical switch. Light input to one of the waveguides yields light output at the other end of the same waveguide only if the refractive index of the said transparent liquid in the host is 5% (or more) lower than said waveguides' refractive index, preferably said liquid has a refractive index that is 10% (or more) lower than said patterns' refractive index, more preferably said liquid has a refractive index that is 20% (or more) lower than said patterns' refractive index. Light input to the neutral waveguide will produce light output at the other end of both waveguides and light input to the waveguide with optically lossy film will produce light output only at the other end of the neutral waveguides if a PT-symmetric condition (as detailed in Applicants' Test Method) is satisfied. Light input to the neutral waveguide will produce light output at the other end of the sane neutral waveguide only and light input to the waveguide with optically lossy film will also produce light output only at the other end of the neutral waveguides if a PT-broken-symmetric condition (as detailed in Applicants' Test Method) is satisfied.

The proposed system in Example 1 can be used to sense refractive index of liquids. Waveguides and optically lossy film's dimensions and the refractive index of liquid can be chosen, such that the system operate at the onset of PT-broken-symmetric regime or at Exceptional Point (EP). The light output at EP is highly sensitive to environmental fluctuations. Slight changes in the refractive index of the said transparent liquid can be monitored by observing the changes in light intensity at the output of the neutral waveguide.

Since the existence of chemicals, biochemicals, biological material, and small particles in the said transparent liquid changes the refractive index of the liquid, the proposed system in Example 1 can be used to sense chemicals, biochemicals, biological material, and small particles as well.

Since the change of temperature of the said transparent liquid changes the refractive index of the liquid due to thermo-optic effect, the proposed system in Example 1 can be used to sense changes in temperature as well.

Every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An optofluidic device comprising:

a) a substrate having a top side and a bottom side and a refractive index;

b) two or more patterns, each pattern having a top side and a bottom side, said bottom side disposed on said substrate's top side, said two or more patterns optionally comprising at least one grating, said two or more patterns being separated from each other by a gap of about 10 nanometers to about 2 microns, and each pattern independently comprising a pattern material having:

(i) a refractive index that is at least 0.01% greater than said substrate's refractive index;

(ii) a transparency of at least 60% to light having a wavelength of 200 nm to about 2000 nm;

and a film, said film being disposed on one of said patterns' top side;

c) at least one fluid host comprising at least one fluid cavity, said at least one fluid cavity comprising a ceiling and sides, said ceiling being flat, said at least one fluid cavity comprising a liquid, each fluid host having a transparency of at least 50% to light having a wavelength of 200 nm to about 2000 nm; and each liquid having a transparency of at least 50% to light having a wavelength of 200 nm to about 2000 nm and a refractive index that is at least 0.01% lower than said pattern material's refractive index;

at least a pair of said two or more patterns being disposed on one side of said substrate, said at least one fluid host being disposed over at least said pair of said two or more patterns such that, said liquid in said fluid host's fluid cavity puts said pair of patterns in liquid communication.

2. The optofluidic device of claim 1 wherein:

a) said substrate comprises a material selected from the group consisting of fused-silica, quartz, silicon, and sapphire wafer;

b) said pattern material comprises a material selected from the group consisting of transparent dielectric films and light emitting films, c) said fluid host comprises a material selected from the group consisting of transparent polymers, borosilicate, fused-silica, quartz;

d) said liquid comprises a material selected from the group consisting of an aromatic hydrocarbon, iodomethane, alcohol, and water; and e) said film having a thickness from about 10 nanometers to about 300 nanometers.

3. The optofluidic device of claim 2 wherein said film has a thickness from about 50 nanometers to about 200 nanometers and said film comprises a metal.

4. The optofluidic device of claim 3 wherein said film has a thickness from about 80 nanometers to about 140 nanometers and a complex refractive index.

5. The optofluidic device of claim 1 comprising 1 through 20 pairs of said two or more patterns.

6. The optofluidic device of claim 1 comprising 1 through 6 fluid hosts.

7. The optofluidic device of claim 1 wherein:

a.) said two or more patterns are symmetric and have a geometry selected from a line, a curved line, a ring, a disk, a triangle, a polygon;

b.) each said fluid host has, independently, a periphery that is a polygon, circular, or triangular; and c.) each said fluid cavity's sides, independently form a polygon, triangle, or said sides are curved.

8. The optofluidic device of claim 1 wherein each fluid host independently comprises one to four fluid cavities.

9. The optofluidic device of claim 1, wherein each pattern comprises one grating.

10. The optofluidic device of claim 1, wherein each pattern comprises two gratings.

11. An article comprising the optofluidic device of claim 1 said article being a laser, gas sensor, chemical sensor, biochemical sensor, biological sensor, particle sensor, temperature sensor, force sensor, refractive index sensor, magnetic sensor, inertial sensor or optical signal processor.

12. A finished article comprising the article of claim 11, said finished article being a motor vehicle, a water vehicle, an aerospace vehicle, computer, weapon systems, wireless device or biomedical device.

13. A process of making an optofluidic device comprising:

a) a substrate having a top and a bottom side and a refractive index;

b) two or more patterns, each pattern having a top and a bottom and optionally comprising two gratings, each pattern being separated from each other by a gap of about 10 nanometers to about 2 microns and each pattern independently comprising a pattern material having:

(i) a refractive index that is at least 0.01% greater than said substrate's refractive index, (ii) a transparency of at least 60% to light having a wavelength of 200 nm to about 2000 nm;

and a film, said film being disposed on one of said patterns;

c) at least one fluid host comprising at least one fluid cavity comprising a liquid, each fluid host having a transparency of at least 50% to light having a wavelength of 200 nm to about 2000 nm; and each liquid having a transparency of having a transparency of at least 50% to light having a wavelength of 200 nm to about 2000 nm and a refractive index that is at least 0.01% lower than said pattern material's refractive index;

at least a pair of said two or more patterns being disposed on one side of said substrate, said at least one fluid host being disposed over at least said pair of said two or more patterns; and the process comprising the steps of fluid coupling said patterns by introducing into said fluid host's fluid cavity a liquid that puts all said patterns in liquid communication, said patterns being evanescently coupled optical waveguides.

14. The optofluidic device of claim 13, wherein each pattern comprises one grating.

15. The optofluidic device of claim 13, wherein each pattern comprises two gratings.

16. The process of claim 13 wherein:

a) said substrate comprises a material selected from the group consisting of fused-silica, quartz, silicon, and sapphire wafer;

b) said pattern material comprises a material selected from the group consisting of transparent dielectric films and light emitting films;

c) said fluid host comprises a material selected from the group consisting of transparent polymers, borosilicate, fused-silica, quartz;

d) said liquid comprises a material selected from the group consisting of an aromatic hydrocarbon, iodomethane, alcohol, and water; and e) said film having a thickness from about 10 nanometers to about 300 nanometers.

17. The process of claim 13 wherein said film has a thickness from about 50 nanometers to about 200 nanometers and said film comprises a metal.

18. The process of claim 17 wherein said film has a thickness from about 80 nanometers to about 140 nanometers and a complex refractive index.

19. The process of claim 13 wherein said optofluidic device's fluid cavity comprises at least one fluid cavity having at least one fluid inlet and at least one fluid outlet.

20. The process of claim 13 wherein said optofluidic device comprises 1 through 20 pairs of said two or more patterns.

21. The process of claim 13 wherein said optofluidic device comprises 1 through 6 fluid hosts.

22. The process of claim 13 wherein for said optofluidic device:

a.) said two or more patterns are symmetric and have a geometry selected from a line, a curved line, a ring, a disk, a triangle, a polygon;

b.) each said fluid host has, independently, a periphery that is a polygon, circular, or triangular; and c.) each said fluid cavity has, independently, a geometry that is a polygon, circular, triangular.

23. The process of claim 13 wherein for said optofluidic device each fluid host independently comprises 1 to 4 fluid cavities.

24. A method of using optofluidic device of claim 1 comprising:

a) placing said patterns in fluid contact using a fluid;

b) inputting light to one of said patterns to induce light coupling with another pattern and light splitting; and c) detecting said split light.

25. A method of using optofluidic device of claim 10 comprising:

a) placing said patterns in fluid contact using a fluid;

b) inputting light to one of said pattern's gratings to induce light coupling with another pattern and light splitting; and c) detecting said split light.

26. The method of claim 24 wherein the fluid's composition is altered until said fluid and said patterns are parity-time symmetrical.

27. The method of claim 25 wherein the fluid's composition is altered until said fluid and said patterns are parity-time symmetrical.

28. The method of claim 24 wherein a liquid with a refractive index equal to or lower than that of fluid host is flown through the fluid host.

29. The method of claim 28 wherein a liquid with a refractive index equal to that of fluid host is flown through the fluid host.

30. The method of claim 24 wherein the coupled patterns have a coupling strength between coupled patterns and said coupling strength is tuned in real time by flowing two or more liquids having different refractive indices through said fluid host.

31. The optofluidic device of claim 1 wherein said at least one fluid cavity has at least one fluid inlet and at least one fluid outlet.

32. The optofluidic device of claim 3 wherein said film comprises silver, gold, copper, aluminum, platinum, titanium, chromium, iridium, molybdenum, nickel, niobium, palladium, rhodium, rhenium, ruthenium, zirconium or mixtures thereof.

33. The process of claim 17 wherein said film comprises silver, gold, copper, aluminum, platinum, titanium, chromium, iridium, molybdenum, nickel, niobium, palladium, rhodium, rhenium, ruthenium, zirconium or mixtures thereof.

* * * * *